United States Patent
Porwal et al.

(10) Patent No.: US 10,740,052 B2
(45) Date of Patent: Aug. 11, 2020

(54) INTEGRATED SERVICES FOR FORMS GENERATION AND MAINTENANCE ON CLOUD

(71) Applicant: SAP SE, Walldorf (DE)

(72) Inventors: Priyanka Porwal, Udaipur (IN); Jan Schrage, Helmstadt-Bargen (DE); Neelesh Kamath, Bangalore (IN); Karthik S, Kolar (IN); Weicheng Wang, Shanghai (CN); Changqing Liu, Shanghai (CN); Yalan Gong, Shanghai (CN)

(73) Assignee: SAP SE, Walldorf (DE)

( * ) Notice: Subject to any disclaimer, the term of this patent is extended or adjusted under 35 U.S.C. 154(b) by 110 days.

(21) Appl. No.: 15/384,330

(22) Filed: Dec. 20, 2016

(65) Prior Publication Data

US 2018/0173477 A1   Jun. 21, 2018

(51) Int. Cl.
*G06F 3/12* (2006.01)
*H04N 1/00* (2006.01)
*G06F 16/951* (2019.01)
*G06F 40/174* (2020.01)
*G06F 40/186* (2020.01)
*G06K 9/00* (2006.01)

(52) U.S. Cl.
CPC .......... *G06F 3/1243* (2013.01); *G06F 3/1206* (2013.01); *G06F 3/1287* (2013.01); *G06F 16/951* (2019.01); *G06F 40/174* (2020.01); *G06F 40/186* (2020.01); *H04N 1/00212* (2013.01); *H04N 1/00244* (2013.01); *G06F 3/1204* (2013.01); *G06F 3/1222* (2013.01); *G06F 3/1238* (2013.01); *G06K 9/00449* (2013.01)

(58) Field of Classification Search
None
See application file for complete search history.

(56) References Cited

U.S. PATENT DOCUMENTS

2005/0262049 A1* 11/2005 Somppi ............... G06F 17/2247
2009/0289901 A1* 11/2009 Aleixo ................. G06Q 10/06
                                                             345/173

(Continued)

*Primary Examiner* — Benny Q Tieu
*Assistant Examiner* — Haris Sabah
(74) *Attorney, Agent, or Firm* — Fish & Richardson P.C.

(57) ABSTRACT

Various embodiments of systems and methods for integrated services for form generation and maintenance on cloud are described herein. The method includes receiving a request for a form-related service from a client. The form-related service may comprise at least one of generating a form, printing the form, extracting one or more form templates, extracting one or more form schemas, and uploading one or more tenant-created form templates onto a cloud template store. The received request is authenticated. Upon a successful authentication, one or more actions may be performed to render an output based upon the request. The output may include one of a form, the one or more form templates, the one or more form schemas, and a notification for successful or unsuccessful uploading of the one or more tenant-created form templates onto the cloud template store. Upon unsuccessful authentication, an error message may be displayed.

9 Claims, 7 Drawing Sheets

(56) References Cited

U.S. PATENT DOCUMENTS

| | | | | |
|---|---|---|---|---|
| 2011/0125575 A1* | 5/2011 | Lasker | ................... | G06Q 30/02 |
| | | | | 705/14.53 |
| 2011/0137977 A1* | 6/2011 | Nun | ....................... | G06Q 10/06 |
| | | | | 709/203 |
| 2012/0310786 A1* | 12/2012 | Suzuki | ................. | G06Q 10/101 |
| | | | | 705/27.1 |
| 2014/0075026 A1* | 3/2014 | Kao | ................... | G06F 17/30557 |
| | | | | 709/225 |
| 2014/0089789 A1* | 3/2014 | Schowtka | ............. | G06F 40/186 |
| | | | | 715/243 |
| 2016/0140654 A1* | 5/2016 | Bhat | ................... | G06Q 40/025 |
| | | | | 705/7.26 |
| 2016/0255082 A1* | 9/2016 | Rathod | ................... | H04L 63/10 |
| | | | | 726/1 |
| 2016/0259771 A1* | 9/2016 | Sato | ....................... | G06F 3/1243 |
| 2016/0285862 A1* | 9/2016 | Mondal | ............. | G06F 17/30011 |
| 2017/0019314 A1* | 1/2017 | Chieu | ................. | H04L 41/5054 |

* cited by examiner

INTEGRATED SERVICES FOR FORMS GENERATION AND MAINTENANCE ON CLOUD

TECHNICAL FIELD

The field generally relates to generation and maintenance of forms.

BACKGROUND

A form refers to a formatted document which contains one or more blank fields. The one or more blank fields may be filled with data by a user. There may be various types of form related to different systems, e.g., legal forms, financial forms, tax-related forms, etc. On-premise systems like human capital management (HCM), supplier relationship management (SRM), etc., maintain various forms to be used within their respective processes. These forms may require to be changed or updated periodically, e.g., based upon change in legal requirements or business practices. Updating these forms with each version (release) of the on-premise systems and their corresponding enhancement package (EHP) may be an arduous task. Further, the on-premise systems may be required to install on-premise Adobe® document services (ADS) server to generate or print these forms, e.g., in .pdf format. Installing ADS server, for each on-premise system, is again a time consuming and an arduous task. Moreover, searching various websites or systems to retrieve different forms or previous version(s) of different forms may also be a tedious and a time consuming task.

SUMMARY

Various embodiments of systems, computer program products, and methods for integrated services for forms generation and maintenance on cloud are described herein. In an aspect, a request for a form-related service is received. The form-related service hosted on cloud comprises at least one of generating a form, printing the form, extracting one or more form templates, extracting one or more form schemas, and uploading one or more tenant-created form templates onto a cloud template store. The received request is authenticated. Upon a successful authentication, one or more actions are performed to render an output based upon the request. The rendered output is one of the form, the one or more form templates, the one or more form schemas, and a notification for successful or unsuccessful uploading of the one or more tenant-created form templates onto the cloud template store. Upon unsuccessful authentication, an error message is displayed.

The above methods, apparatus, and computer program products may, in some implementations, further include one or more of the following features.

The request is received through a tenant-specific uniform resource locator (URL) and the request includes a tenant account details including a tenant identifier (ID) and a password.

The request is received through an open data protocol (OData) based application programming interface (API).

The request includes at least one of one or more form parameters for identifying a form template for which service is requested and one or more form data indicating values of one or more blank fields or placeholders within the form template for which service is requested.

A form parameter comprises one of the form ID, form locale, form version, and form status and the one or more form data is in Extensible markup language (XML) format.

The form template is in an extensible markup language (XML) data package (XDP) format including XML schema of the form and optionally scripts which control interactive feature of the form.

The cloud template store comprises one or more service provider templates accessible to all registered clients and one or more client-specific templates accessible to respective client created and uploaded those templates.

When the request is to print the form, the cloud template store is searched to identify a form template based upon one or more form parameters within the request. The identified form template and the form data is sent to a printing engine to print the form. The printed form is sent to a client.

The request is from one of a software module, a user, and a system including one of a customer relationship management (CRM), human resources management (HRM), and enterprise resources planning (ERP).

These and other benefits and features of various embodiments will be apparent upon consideration of the following detailed description of embodiments thereof, presented in connection with the following drawings.

BRIEF DESCRIPTION OF THE DRAWINGS

The embodiments are illustrated by way of examples and not by way of limitation in the figures of the accompanying drawings in which like references indicate similar elements. The embodiments may be best understood from the following detailed description taken in conjunction with the accompanying drawings.

Like reference symbols in the various drawings indicate like elements.

DESCRIPTION

Figure 1:
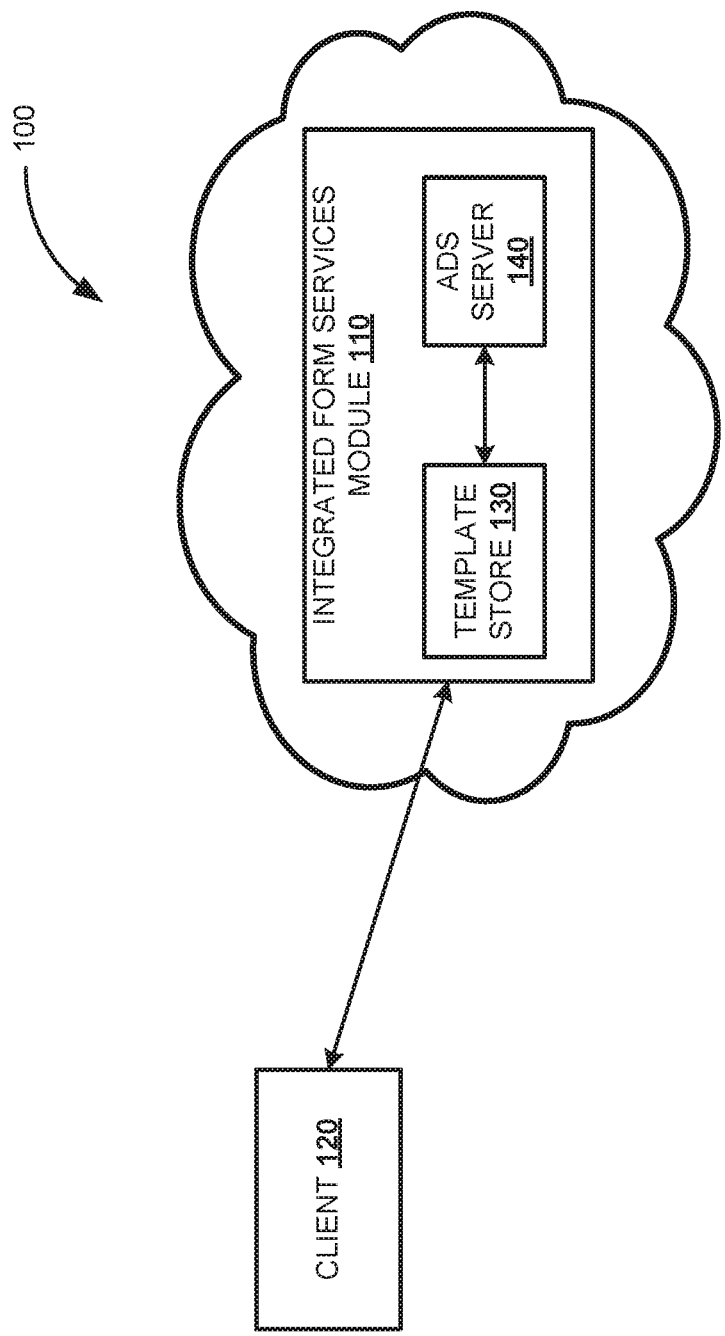
FIG. 1 is a block diagram illustrating components for generating and maintaining forms on cloud, according to an embodiment.

Embodiments of techniques for integrated services for forms generation and maintenance on cloud are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

"Form" refers to a formatted document which includes one or more pages. The one or more pages of the formatted document or form may contain various fields. One or more fields may be blank and may be filled with data by the users. In a database context, a form may refer to a window or a screen that contains one or more fields or spaces to enter data. Each field holds a field label so that any user who views the form gets an idea of its contents. There may be various categories of forms related to different systems like legal forms, financial forms, tax-related forms, etc. Each category of form (i.e., form category) includes numerous forms. For example, 'legal form' category may include numerous legal forms, e.g., forms related to sole proprietorship, partnership, corporation, limited liability company (LLC), non-profit organization, etc. These forms may be required to be changed or updated periodically, e.g., based upon change in various legal requirements and/or business practices. A form may be different for different countries, e.g., the form language, format, content, etc., may be different for different country and may be required to be updated based upon the change in legal requirements and/or business practices of respective country.

"Form parameter" refers to a characteristic or metadata of a form which may help to define or identity the form. For example, form ID (unique identifier assigned to form), form version, form locale, and accessibility mode, etc., may be some of the form parameters. Form locale indicates a country for which the form is applicable and the language in which form is to be generated and form accessibility mode indicates whether the form is to be in a format applicable for differently-abled clients (e.g., blind users). Each form parameter has corresponding value or data. For example, the data or value for the form parameter 'form ID' may be 'HR_DEP_DECL' (i.e., form for dependent declaration), the value for the form parameter 'form locale' may be 'en_US' (i.e., form is in USA version of english language), and the value for the form parameter 'accessibility mode' may be '0' (e.g., indicating that the form is not in format for differently-abled clients). The value may be of specific data type. For example, the value (e.g., HR_DEP_DECL) for form parameter 'form ID' and the value (e.g., en_US) for the form parameter 'form locale' may be of type 'variable character' or VARCHAR' and the data or value (e.g., 0) for the form parameter 'accessibility mode' may be 'Boolean' data type ('0' for normal format and '1' for differently-abled user format).

"Business object" or "BO" refers to set of entities with common characteristics and common behavior. For example, a form template for dependent declaration namely 'HR_DEP_DECL' may be a BO for generating forms (i.e., entities) for dependent declaration for respective employees of an organization.

"Tag" refers to a keyword, a term, or a label which may be assigned or attached to a business object (e.g., a form template). In an embodiment, the tag assigned to the BO is automatically gets assigned to one or more entities within the BO or generated from the BO. For example, the tag assigned to the BO or form template 'HR_DEP_DECL' may automatically be assigned to the forms (entities) generated from the form template 'HR_DEP_DECL'. The tag may be a kind of metadata which helps describe the BO and the entity generated from the BO (e.g., the form). The tag acts like an add-on or the label and does not alter the original BO or form template. The tag may be assigned by a user composing the BO (e.g., the form template). The tagged BO or entity (e.g., tagged form templates or forms) may be retrieved or searched based upon its tag(s). The BO or the form template may be tagged using various tagging techniques known in the art.

"Classification" refers to grouping the BO or entities (e.g., form templates or forms) based on their tags. For example, forms having at least one same tag may be grouped together under same group or class. For example, the forms related to sole proprietorship, partnership, corporation, limited liability company (LLC), and non-profit organization may have a common tag (e.g., "legal") and may therefore, be categorized or grouped together under the same category (i.e., "legal form" category).

"Integrated form services module" refers to a software application hosted on cloud to generate and manage various forms (i.e., form-as-a-service or FaaS) to be used across different products or systems (e.g., human capital management (HCM), supplier relationship management (SRM), etc.). The integrated form services module may be accessed from anywhere at anytime by registered clients. The services provided by the integrated form services module may be consumed by the registered client (e.g., user, system, company, organization, or module, etc.) through their corresponding registered account. The integrated form services module provides services for: (i) accessing and retrieving different forms, e.g., for different products or systems; (ii) searching forms based upon its metadata, e.g., a form's storage_location, name, version, last_modified_date, author_name, etc.; (iii) retrieving form schema; (iv) retrieving all or different versions of form: (v) printing form, e.g., in .pdf format; (vi) sending form as an attachment through an email; (vii) uploading and storing customized forms; (viii) tagging forms (e.g., while uploading and/or storing forms); (ix) searching forms based upon its tag(s); (x) translating form in different languages; and (xi) retrieving country-specific forms which may be generated by the integrated form services module, e.g., based upon language, legal rules, policies, and business practices of the specific country.

"Tag Manager" refers to a component for managing tags. The tag manager may be a part of software applications such as an integrated form service module or it may be a separate and an independent unit communicatively coupled to the integrated form service module. The tag manager may: (i) enable associating tags to the form templates (e.g., while uploading form onto the integrated form service module); (ii) provide auto-tagging or auto-tag suggestion facility based upon a context of the form templates; and (iii) provide search results (i.e., forms or form templates) based upon the search keyword or tag provided by the user.

"Extensible markup language or XML schema" refers to structure of a form. The XML schema includes various dimensions and specification of the form, e.g., line margin, boarder, header, footer, body specification, etc., to design form with perfect dimensions and specifications. Typically, various legal forms may be required to be in a specified dimension and format and XML schema may include specified dimension and format, e.g., for a legal form.

"Form data" refers to content of a form or value of one or more blank fields (placeholders) within the form. For example, company name, employee name, age, years of service, dependent name, etc., may be form data (values of blank fields) for dependent declaration form (i.e., DEP_DECL form). The form data may be in XML format and may be referred as XML content of the form.

"In-memory" database refers to a database that relies on main memory for computer data storage. In some examples, the in-memory database includes a combination of main memory and disk storage. Also, the in-memory database may support real-time analytics and transactional processing including replication and aggregation techniques. Also, within the in-memory database environment, calculation logic is pushed down into the database layer (as opposed to residing in the application layer) such that the processing time for querying and manipulating the data within the database may be reduced as compared to conventional relational database. In some examples, the in-memory database may be SAP HANA® Enterprise 1.0 (or any other versions). However, the techniques described herein may be applied to any type of relational database as well.

FIG. 1 is a block diagram illustrating exemplary system 100 for integrated form services for generation and maintenance of forms on cloud, according to an embodiment. The system 100 comprises integrated form services module 110 hosted on cloud to provide various form services to registered client 120. The client 120 may be a user, a software module, a product, a company, or a system such as human capital management (HCM), supplier relationship management (SRM), finance management, employee center (EC), on-demand solution, etc. A client is required to be registered with the integrated form services module 110 to consume the services provided by the integrated form services module 110. Once the client is registered, their account is created and maintained by the integrated form services module 110. The registered client 120 can access the integrated form services module 110 through their account. The registered client 120 can send service request such as request to retrieve specific form, store created form template, retrieve form schema, retrieve all or specific version of form, retrieve form related to particular country/locale, etc. The request may be sent to the integrated form services module 110, e.g., through an open data protocol (OData) based application programming interface (API). In an embodiment, the request may include form parameters and/or form data. The form parameters may be form_ID (unique identifier assigned to form), locale, version, and accessibility mode (indicating if form is to be in format for differently-abled clients like blind users), etc., and form data includes value of one or more blank fields within the form. The form data may be provided in an Extensible markup language (XML) format. Based upon the request (e.g., form parameters and/or form data), the integrated form services module 110 performs one or more actions and returns the required output. For example, when the registered client 120 sends the request to print a form in .pdf format, the integrated form services module 110 identifies a form template from template store 130 corresponding to the form parameters within the request. The template store 130 stores various pre-defined form templates, e.g., in XML data package format (i.e., XDP format). The form template (e.g., in XDP format) includes structure of the final form (i.e., XML schema of the form) and/or scripts which control interactive feature of the form, e.g., whether the form is to be an interactive form or non-interactive form. The identified form template and the form data (e.g., from the request) is sent to ADS server 140. Based upon the form template and the form data, the ADS server 140 generates the form, e.g., in .pdf format. The generated form is sent to the registered client 120. e.g., the form may be downloaded or stored on the registered client 120 system. In an embodiment, the registered client 120 may opt for receiving/sending the form as an email attachment. The registered client 120 can consume various other services provided by the integrated form services module 110. For example, query template store for retrieving various forms, form templates, schemas, form version, etc. The registered client 120 may be an individual user, the software module, the system, the company, etc.

The client may be required to be registered to the integrated form services module 110 to consume various services. Once the client is registered, the integrated form services module 110 creates an account or instance corresponding to the registered client (e.g., the registered client 120). The account may be referred as HANA® cloud platform (HCP) account of the client. In an embodiment, when the client is a company or an organization, the account is created corresponding to the company and all employees of the company may be automatically registered and can access the integrated form services module 110 through the company's account. The registered client 120 can access the integrated form services module 110 through their account or through company's account. The account includes client authorization details, e.g., client identifier (ID) and password. In an embodiment, upon creating the account, the integrated form services module 110 assigns a tenant or user ID to respective clients. In case the client is the company, each employee (user) of the company or the organization may be assigned respective user ID and they all may access the integrated form services module 110 using their respective ID and password.

In an embodiment, once the account is created, the integrated form services module 110 assigns respective or specific uniform resource locator (URL) or address to respective client through which the client can access the integrated form services module 110 (i.e., services, applications, etc.). In an embodiment, the specific URL or the address may include registered user's ID and/or password.

In an embodiment, once the account is created, the client or user details may be stored. A user database table may be maintained to store information related to all users registered with the integrated form services module 110. The registered user may access services through its account (instance) or its company's instance on HCP. An exemplarily user database table (namely: FaaS_User table) may be as shown below:

| USER_ID | USER_BELONGED_INSTANCE |
|---------|------------------------|
| ABC     | X                      |
| MNO     | X                      |
| PQR     | X                      |
| SRT     | Y                      |

The FaaS_User table stores all current users registered for accessing or consuming the services provided by the integrated form services module 110. In an embodiment, the FaaS_User table may include fields, e.g., USER_ID which can be a variable character (VARCHAR) with maximum length up to, e.g., 50 characters (i.e., VARCHAR(50)) and indicates a primary key or unique ID of the user who may access the services provided by the integrated form services module 110 and USER_BELONGED_INSTANCE which can be a variable character (VARCHAR) with maximum length up to, e.g., 50 characters (i.e., VARCHAR(50)) and indicates user's instance or user's company instance on HCP. As shown, user ABC, MNO, and PQR are employees of same company (company instance or account ID 'X') and user SRT belongs to another company with instance ID 'Y.' In an embodiment, the users can access, delete, edit, etc., only those templates which belongs to user's instance or user's company instance. Therefore, privacy of companies and control to access, edit, or delete may be maintained. In an embodiment, on client's side, an administrator may configure "permission settings" for various employees/users, e.g., based upon their roles. In an embodiment, the "permission settings" may include options such as whether the employee can generate forms, upload forms, edit forms, view all forms, access only employee self-service (ESS) forms, etc.

Once the account is created, the registered clients/users may access one or more applications of the integrated form services module 110 and consume its services, e.g., print form service. The registered user can initiate service requests or calls through their registered account/instance. In an embodiment, the requests or calls may include authentication details (e.g., HCP account ID and password) of the registered user raising the requests or calls. In an embodiment, the authentication details may be encrypted and included as header within the request or call. The request may be made through an OData based API.

Figure 2:
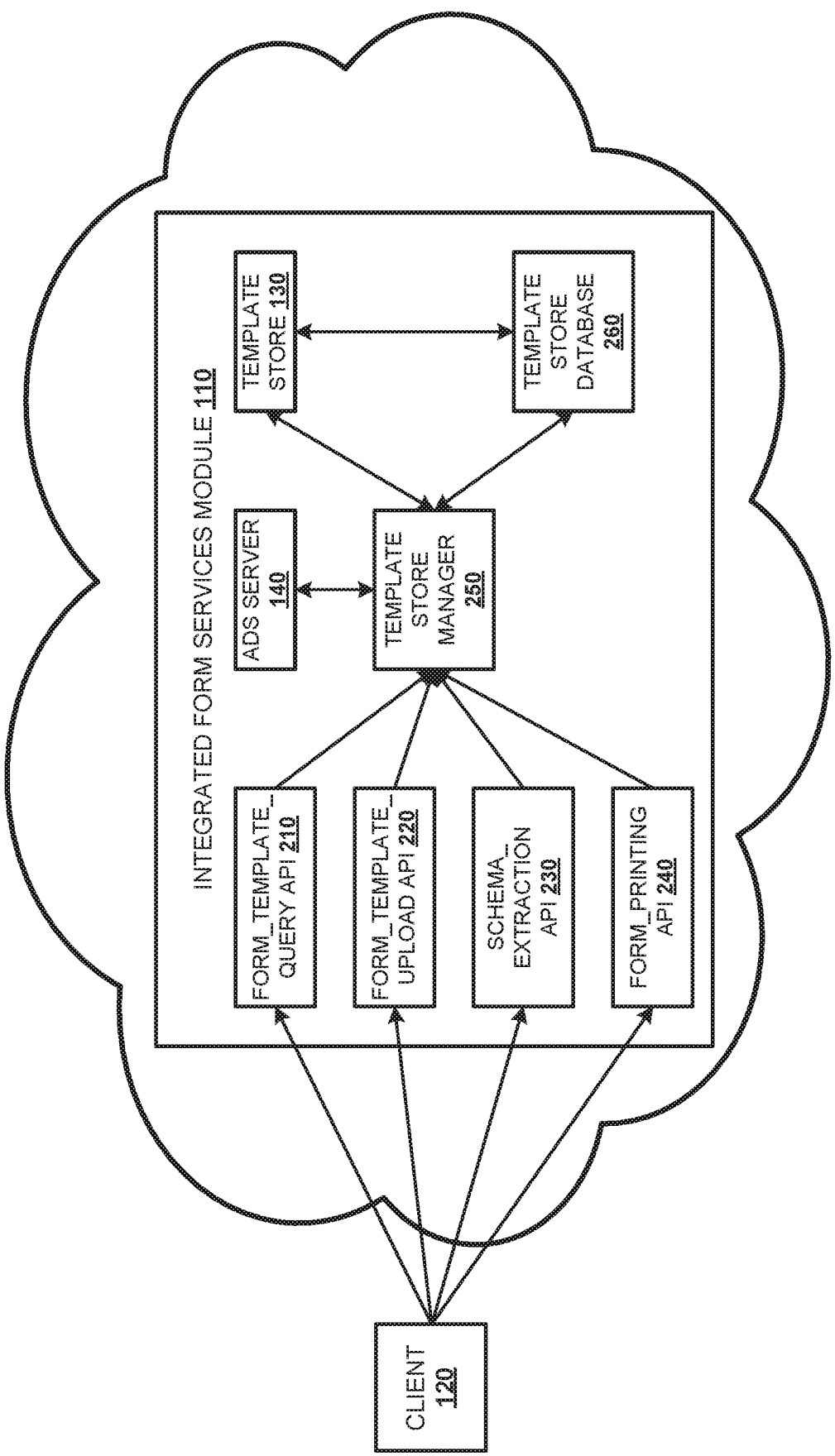
FIG. 2 is a block diagram illustrating application programming interfaces (APIs) to handle different types of requests pertaining to forms, according to an embodiment.

FIG. 2 illustrates various APIs to handle different kind of requests. For example, the integrated form services module 110 may include form_template_query API 210 to handle all queries related to form templates (e.g., query 'template store' 130), form template upload API 220 to handle all requests for uploading form templates (e.g., generated by clients) onto the template store 130, schema_extraction API 230 to handle requests to extract form schema (e.g., in XML format), and form_printing API 240 to handle requests to print form, e.g., in .pdf format. In an embodiment, the client or user may make call or request (through those APIs) for which they have permission, e.g., according to their "permission settings." The requests (e.g., through APIs 210-240) may be received by template store manager 250. The template store manager 250 handles the requests, e.g., retrieves requested data from template store 130 based on query, upload form templates in template store database 260 and update the template store 130 accordingly, extract form schema from template store database 260, and send form template along with form data to ADS server 140 for generating .pdf forms, etc. In an embodiment, the template store manager 250 may be an application or program installed to handle all requests coming through various APIs, e.g., APIs 210-240.

In an embodiment, to call APIs (e.g., to query form template, to print form, to extract form schema, to upload client generated form templates, etc.) call parameters (e.g., form ID, locales, etc.) may be passed in JavaScript object notation or JSON format to respective API interface. Each call or request includes some mandatory parameters and some optional parameters. For example, to call the form_template_query API 210 to query form templates store 130, form ID may be mandatory parameter while form locale and status may be optional parameters. Similarly, to call form_template_upload API 220 to upload, the form template, form locale, form synchronization status, and form status (indicating whether the form template is active '1' or inactive '0') are mandatory parameters. Form upload may be mass upload wherein multiple XDP form templates might be uploaded to template store or database. Form synchronization status for the to-be-uploaded form template indicates whether a form template with the same form ID and locale already exists and needs to be synchronized with the prior version, e.g., by incrementing the form version number by 1. Synchronization status can have value 'true' if form template with the same form ID and locale already exists and needs to be synchronized or 'false' if a form template is new and being uploaded for the first time. An exemplarily call (content) to call form template_upload API 220 to upload form template may be as shown below:
Content:

```
{
FormTemplate: XDP Files (File)
FormLocale: "en_US"
FormSync: "false"
FormStatus: "1"
}
```

In an embodiment, the form template may be tagged while uploading the form template. In an embodiment, the integrated form services module 110 includes a tag manager (not shown) to enable associating tags to the form templates. In an embodiment, the tag manager may provide auto-tag suggestion based upon a context of the form templates. For example, when a form template is related to "sole proprietorship", the tag manager may provide auto-tag suggestion such as "legal," "ownership," "proprietorship," etc.

The below paragraphs illustrate some exemplarily requests/calls raised by the registered clients.

The call may be for retrieving or printing form (e.g., in .pdf format). The request includes form parameters to identify the form format and template. The request may also optionally include form data (i.e., value of one or more blank fields within the form). In an embodiment, the form data may be provided in an Extensible mark-up language (XML) format. For example, if the client wants to retrieve employment proof form for employee_name 'Mr. R', age '39 years', designation 'Manager', and address 'xyzm . . . ', then the form data may be provided in the XML format as shown below:
<Employee_Name>Mr. R.</Employee_Name>
<Age>39</Age>
<Designation>Manager</Designation>
<Address>xyzm</Address>

In an embodiment, the form data (e.g., in XML format) may be created on client device using mapping configuration. Mapping configuration helps map one or more blank fields (placeholders) within the requested (e.g., to-be-printed or to-be-retrieved) form to their corresponding actual data field of one or more database tables. In an embodiment, the form data, and the mapping configuration may be provided along with the request and the mapping may be performed by the integrated form services module 110 to generate the form data in XML format.

Once the request for printing form is received, the integrated form service module 110 reads the form parameters to identify a form template from template store 130. In an embodiment, the template store 130 stores various predefined form templates, e.g., in XML data package format (i.e., XDP format).

The template store 130 may be searched to identify form template based upon the request (i.e., form parameter), e.g., Form_Name='HR_EMP_PROOF'. LOCALE='EN_US'.

VERSION='2.0', ACCESSIBILITY_MODE='0'. In an embodiment, the form template (e.g., in XDP format) along with form data may be sent to the ADS server 140 to print form (HR_EMP_PROOF) in .pdf format. In an embodiment, the form template in XDP format includes structure of the final form (i.e., XML schema of the form) and scripts which control interactive feature of the form, e.g., whether the form is to be an interactive form (i.e., printed form in which data may be filled in electronically) or non-interactive form (i.e., printed form in which data filled in manually and not electronically).

An exemplarily template store (e.g., the template store 130 of FIG. 1) may include a template table (namely form-as-a-service or FaaS_template table) as shown below:

| FORM_ID | TENANT_ID | TEMP_ID | TEMP_NAME | VER | LOCALE | AUT | CREAT_DATE | ... | XML_CONTENT |
|---------|-----------|---------|-----------|-----|--------|-----|------------|-----|-------------|
| abc | X | 001 | BR_HR_DEP_DEC | 0.2 | EN_US | 00M | 29/7/2016 21:04:55 | ... | DEP_DEC.xml |
| xyz | Y | 00N | HR_EMP_PROOF | 0.1 | ENG_IN | 00H | 30/7/2016 20:00:50 | ... | HR_EMP_PROOF.xml |

The FaaS_template table stores all available templates and its metadata. The FaaS_template table includes fields namely FORM_ID, TENANT_ID, TEMP_ID, TEMP_NAME, VER, LOCALE, AUT, CREAT_DATE, and XML_CONTENT. FORM_ID indicates a primary key or unique ID of the FaaS_template table to retrieve form templates from the integrated form services module 110. The FORM_ID may be a variable character (VARCHAR) field with maximum length up to, e.g., 50 characters (i.e., VARCHAR(50)). TENANT_ID field indicates a tenant ID for which the template is applicable and which can access or retrieve the template and it may be a variable character (VARCHAR) with maximum length up to, e.g., 50 characters (i.e., VARCHAR(50)). TEMP_ID indicates an ID of a template form and it may be a variable character (VARCHAR) with maximum length up to, e.g., 50 characters (i.e., VARCHAR(50)). TEMP_NAME indicates a name of the template which can be a variable character (VARCHAR) with maximum length up to, e.g., 50 characters (i.e., VARCHAR(50)). VER field may be a variable character (VARCHAR) with maximum length up to, e.g., 255 characters (i.e., VARCHAR(255)) and indicates version of the template which can be maintained automatically by incrementing by, e.g., 1 whenever a new version of the template with the same template ID and LOCALE is uploaded. LOCALE field indicates the template locale, i.e., country/language in which template is composed and it may be a variable character (VARCHAR) with maximum length up to, e.g., 50 characters (i.e., VARCHAR(50)). AUT indicates a foreign key to table FaaS_Users and USER_ID field within the FaaS table to identify a user created the template and it may also be a variable character (VARCHAR) with maximum length up to, e.g., 255 characters (i.e., VARCHAR(255)). CREAT_DATE field may be a TIMESTAMP (indicating date and time) when the template is created and XML_CONTENT which can be a character large object (or CLOB: a collection of character data) with maximum length up to, e.g., 2147483647 characters and indicates XML content of the template or a file address which stores the XML content of the template. The table may also include fields like IS_LATEST, FORM_STATUS, MODIFIED_BY, and LAST_MODI_DATE, etc. The IS_LATEST field may be Boolean value 1 or 0 (BOOLEAN) or (SMALLINT) and indicates whether the version is latest (e.g., 1) or not (e.g., 0). IS_LATEST may be maintained automatically by the integrated form services module 110. The MODIFIED_BY field indicates the foreign key to table FaaS_Users and USER_ID field within the FaaS table to identify a user last modified the template and it may be a variable character (VARCHAR) with maximum length up to, e.g., 255 characters (i.e., VARCHAR(255)). The LAST_MODI_DATE field can be a TIMESTAMP (indicating date and time) when the template is last modified. The FORM_STATUS field may be Boolean value 1 or 0 (BOOLEAN) and indicates whether the form is active (e.g., 1) or inactive (e.g., 0). In an embodiment, the form_template_query API 210 (FIG. 2) may return only those form templates that are active (Form_Status=1). Therefore, if an uploaded form template is inactive (Form_Status="0"), it cannot be queried by the form_template_query API 210 and may not be used by the form_printing API 240 to print form, e.g., in .pdf format.

Figure 3:
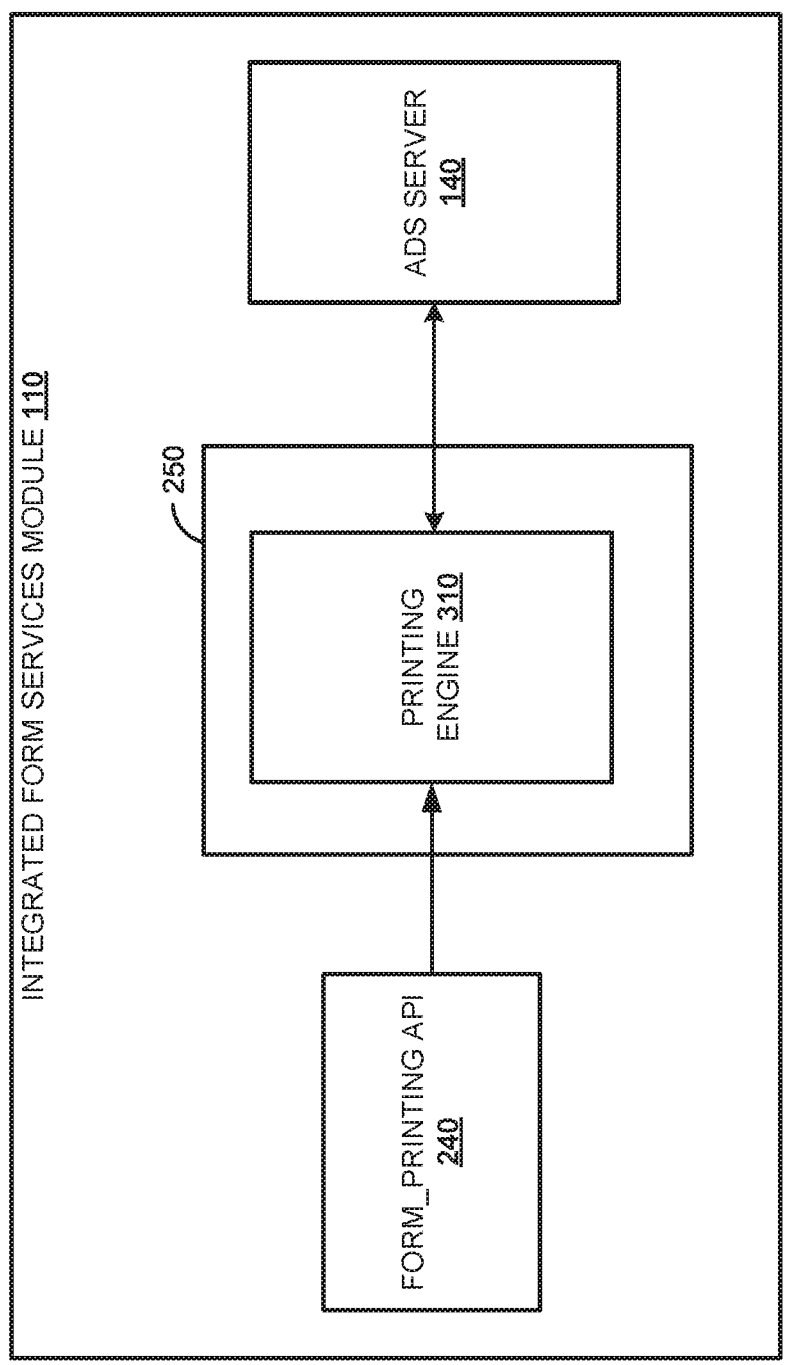
FIG. 3 is a block diagram illustrating a printing engine communicatively coupled to an ADS server to handle request for printing form(s), according to an embodiment.

FIG. 3 is a block diagram illustrating the integrated form service module including printing engine 310 to handle request for printing form(s), according to an embodiment. The printing engine 310 may be an application or set of instructions to handle print form requests and services. The print form request (OData call) is received through form_printing API 240. The received print form request (OData call) may be passed to template store manager 250. The template store manager 250 identifies the form template from the template store 130, e.g., by quering the template store 130. In an embodiment, the printing engine 310 may be a part of the template store manager 250. In another embodiment, the printing engine 310 may be a separate entity communicatively coupled to the template store manager 250. The printing engine 210 communicatively coupled to the template store manager 250 converts the request (OData call) to simple object access protocol (SOAP) call. The SOAP call includes the identified form template and the form data. The SOAP call is sent to the ADS server 140.

Based upon the form template and the form data, the ADS server 140 generates the form, e.g., in .pdf format. The generated form is sent to the client. The form may be downloaded or stored by the client 120. In an embodiment, the client may opt for receiving/sending the form as an email attachment. In an embodiment, when the print form request does not include form data, the ADS server 140 generates (e.g., using the identified form template) the blank form (without data as no form data is provided) which can be later filled-in by the client.

In an embodiment, the request or call may be to query the databases, e.g., FaaS_template table to retrieve, e.g., all locales and versions of a specific form. An exemplarily query may be: AllLocalesAndVersionsOfForm(formId). The requested form (e.g., through form ID) may be 'HR_BR_TERM0. Based upon the query, https://<provider_account>-<tenant_account>.<landscape_host>/", e.g., "https://formservicex78607c04.neo.ondemand.com/print-form-service/odata/Templates?$filter=FormID eq 'HR_BR_TERM0'" may be executed in backend and all locales and versions of the form (HR_BR_TERM0) is displayed or returned. All related locales and versions may be displayed as a JSON format data. In an embodiment, there may be one of below two possibilities:

(i) If the form (HR_BR_TERM0) has more than one locale or more than one version, all locales or versions will be separated by comma and displayed as:

```
{
    "@odata.context": "$metadata#Templates",
    "value": [
        {
            "FormID": "HR_BR_TERM0",
            "FormDescription": "HR_BR_TERM0",
            "FormLocale": "English US (en_US)",
            "Tenant": "Tenant X",
            "FormVersion": "0"
        },
        {
            "FormID": "HR_BR_TERM0",
            "FormDescription": "HR_BR_TERM0",
            "FormLocale": "English US (en_US)",
            "Tenant": "Tenant X",
            "FormVersion": "1"
        },
        {
            "FormID": "HR_BR_TERM0",
            "FormDescription": "HR_BR_TERM0",
            "FormLocale": "Brazil Portugese (pt_BR)",
            "Tenant": "Tenant X",
            "FormVersion": "0"
        },
        {
            "FormID": "HR_BR_TERM0",
            "FormDescription": "HR_BR_TERM0",
            "FormLocale": "Brazil Portugese (pt_BR)",
            "Tenant": "Tenant X",
            "FormVersion": "1"
        }
    ]
}
```

(ii) If the form (HR_BR_TERM0) has only one locale and one version, the one entity may be directly returned as:

```
{
    "@odata.context": "$metadata#Templates",
    "value": [
        {
            "FormID": "HR_BR_TERM0",
            "FormDescription": "HR_BR_TERM0",
            "FormLocale": "English US (en_US)",
            "Tenant": "Tenant X",
            "FormVersion": "0"
        }
    ]
}
```

In an embodiment, if an invalid form ID is inputted or provided in the request, the empty entity may be returned as:

```
{
    "@odata.context": "$metadata#Templates",
    "value": [ ]
}
```

Similarly, the user may query the databases, e.g., FaaS_template table to retrieve all versions of a specific form of specific locale. An exemplarily query may be: AllVersionOfForm(formId and form locale) to retrieve all the versions of the form of requested locale is returned or retrieved. The form ID and locale within the request may be 'HR_BR_TERM0' and 'en_US' respectively. All related versions will be displayed as a JSON format data. For example, based upon the query, "https://formservicex78607c04.neo.ondemand.com/print-form-service/odata/Templates?$filter=FormID eq 'HR_BR_TERM0' and FormLocale eq 'en_US'" may be executed in backend and all versions of the form (ID='HR_BR_TERM0) and locale en_US is displayed or returned. In an embodiment, there may be one of the below two possibilities:

(i) If the form has more than one version, all versions may be separated by comma and displayed as:

```
{
    "@odata.context": "$metadata#Templates",
    "value": [
        {
            "FormID": "HR _BR TERM0",
            "FormDescription": "HR_BR_TERM0",
            "FormLocale": "English US (en_US)",
            "Tenant": "Tenant X",
            "FormVersion": "0"
        },
        {
            "FormID": "HR_BR_TERM0",
            "FormDescription": "HR_BR_TERM0",
            "FormLocale": "English US (en_US)",
            "Tenant": "Tenant X",
            "FormVersion": "1"
        }
    ]
}
```

(ii) If the form has only one locale and one version, the one entity may be directly returned as:

```
{
    "@odata.context": "$metadata#Templates",
    "value": [
        {
            "FormID": "HR_BR_TERM0",
            "FormDescription": "HR_BR_TERM0",
            "FormLocale": "English US (en_US)",
            "Tenant": "Tenant X",
            "FormVersion": "0"
        }
    ]
}
```

In an embodiment, if none of the templates meet the conditions, the empty entity may be returned as:

```
{
    "@odata.context": "$metadata#Templates",
    "value": [ ]
}
```

Once the request/call is received and the requested operation is performed successfully, a notification may be sent to the client. The notification may be in form of extracted form schema, printed .pdf form, one or more specified versions of form, etc. In an embodiment, the notification may be a message, e.g., message that the 'upload request' is executed successfully. For example, when the upload is performed successfully, an exemplarily below message may be displayed:

```
{
    "@odata.context": "$metadata#MassUpload/$entity",
    "value": [
```

-continued

```
{
    "(@odata.mediaContentType": "multipart/form-data",
    "FormID": "HR_BR_TERM0_SUBMIT",
    "FormLocale": "en_US",
    "UploadState": "Success",
    "StateMessage": ""
    }
  ]
}
```

In an embodiment, when there is any error (e.g., in request format such as mandatory parameter not provided, etc.) and the request is not performed successfully, an error message may be displayed to the client. An exemplarily errors that may be displayed may be as shown below:

| ERROR | DESCRIPTION |
|---|---|
| Bad request | Incorrect request parameters |
| Unauthorized access | Authorization header is missing from the request |
| Access forbidden | Incorrect authorization header or lacking required permission |
| Wrong format | Illegal value for Form Status |

Figure 4:
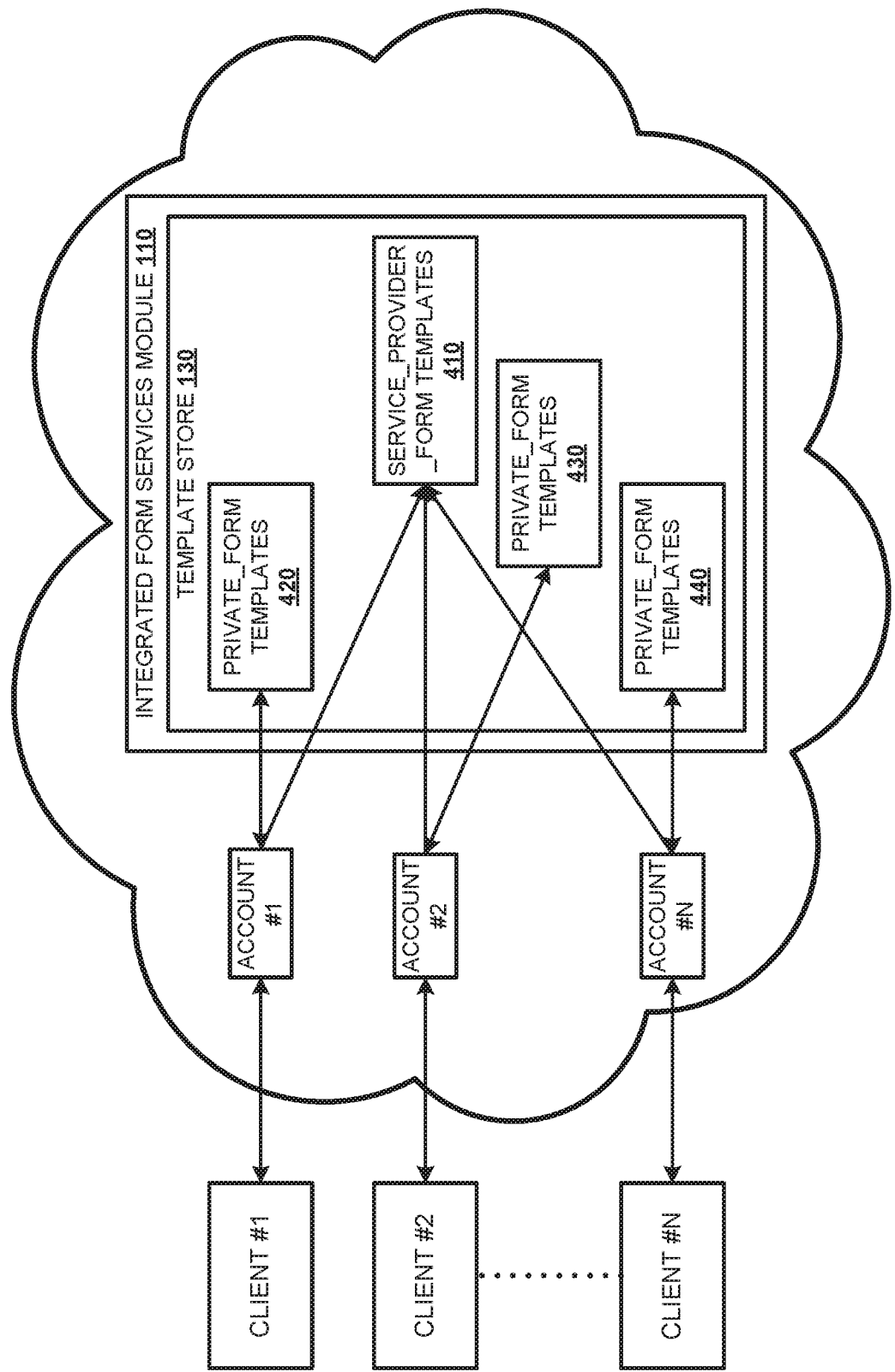
FIG. 4 is a block diagram illustrating components for maintaining forms confidentiality in multitenant environment, according to an embodiment.

FIG. 4 illustrates process to maintain confidentiality and privacy of forms in a multitenant environment, according to an embodiment. Client #1-client # N may be registered clients with respective account (e.g., HCP account) account #1-account # N, respectively. The client #1-client # N may access the integrated form services module 110 (i.e., services, applications, etc.) through their respective account, i.e., account #1-account # N. In an embodiment, the clients may require to register or subscribe to different services and applications to access the respective subscribed services/applications through their respective registered account. In an embodiment, some form templates or data may be available to all registered clients. e.g., service_provider_form templates 410 may be visible to and/or retrieved by all registered clients, e.g., client #1-client # N. In an embodiment, the service_provider-form templates 410 may be read-only and may not be editable. Some form templates or data may be confidential and restricted to specific clients (i.e., client-specific data). For example, the form templates or data created and uploaded by the client #1 may only be accessed, edited, deleted, etc., by client #1, e.g., through account #1 and may be restricted for other clients. Once the clients are identified (e.g., the application(s) may identify the clients) through their account (user or tenant ID and password) or specific URL (http://request), identified clients are provided access to their respective private form templates (i.e., client-specific form templates), according to their access rights. For example, private_form templates 420 may only be accessed by client #1, private_form templates 430 may only be accessed by client #2, and private_form templates 440 may only be accessed by client # N. Therefore, client specific data and form templates may be isolated and secured. Therefore, the form template created, owned, and stored for a registered client may not be rendered to or accessed by other registered clients. In an embodiment, different access or privacy rules may be applied for different users (user ID), e.g., based upon their designation such as some form templates may be restricted for managers. Therefore, the privacy may be maintained.

Figure 5:
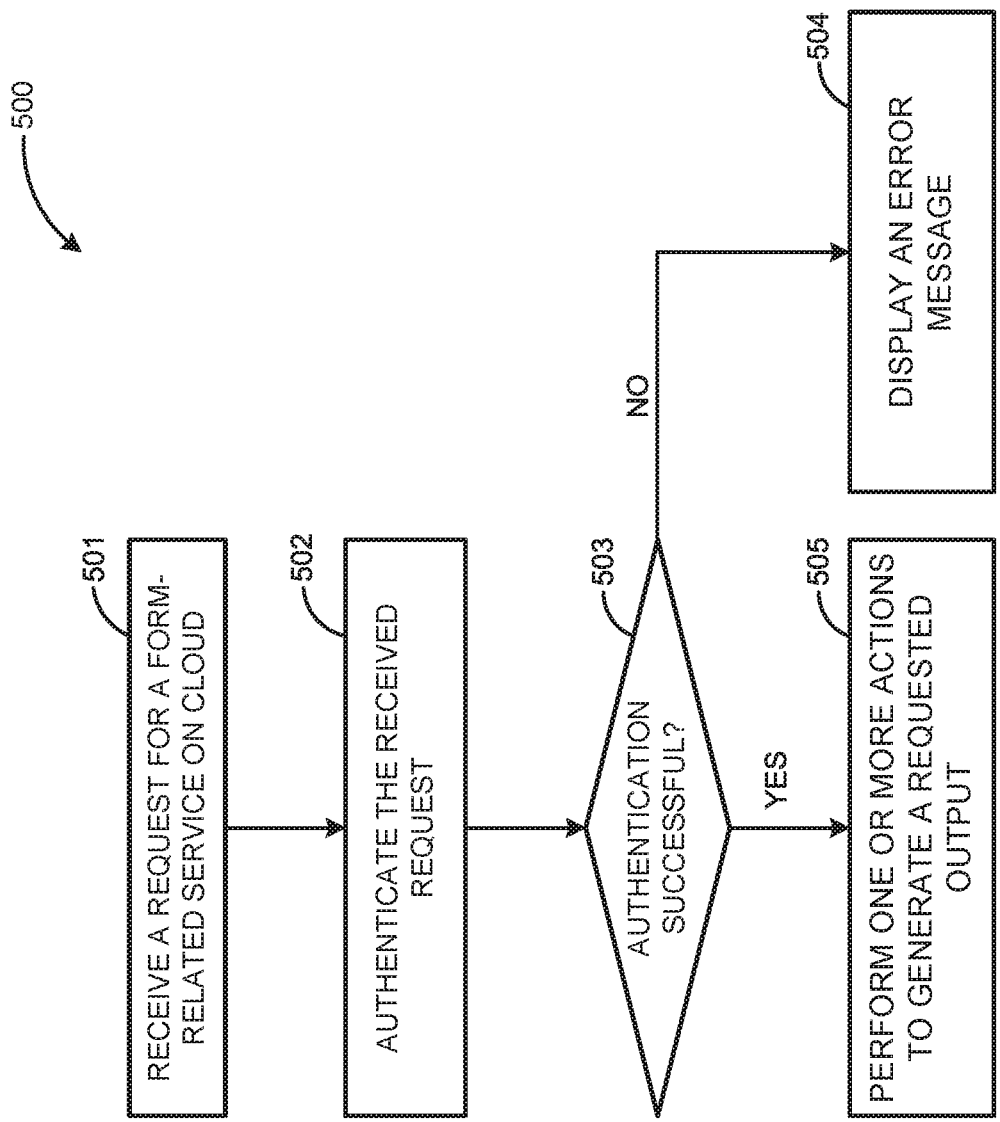
FIG. 5 is a flowchart illustrating a process of integrated form-related services for generating and maintaining forms on cloud, according to an embodiment.

FIG. 5 is a flowchart illustrating a process 500 to provide integrated form-related services for generating and maintaining forms on cloud, according to an embodiment. At 501, a request for a form-related service is received, e.g., from a client's device. The request may be for at least one of generating a form, extracting the form template, extracting the form schema, printing the form, and uploading one or more tenant-created form templates onto a cloud template store (e.g., the template store 130 of FIG. 1). At 502, the received request is authenticated by an integrated form services module (e.g., the integrated form services module 110 of FIG. 1). In an embodiment, the request includes client's account details (e.g., user ID and password) which may be authenticated. At 503, it is determined whether the authentication is successful. When the authentication is not successful (503: NO), an error message is displayed at 504. When the authentication is successful (503: YES), one or more actions are performed by the integrated form service module to generate a requested output at 505. The generated output is one of displaying the form, displaying the form template, displaying the form schema, printing the form, and displaying notification for successful or unsuccessful uploading of the one or more tenant-created form templates.

Figure 6:
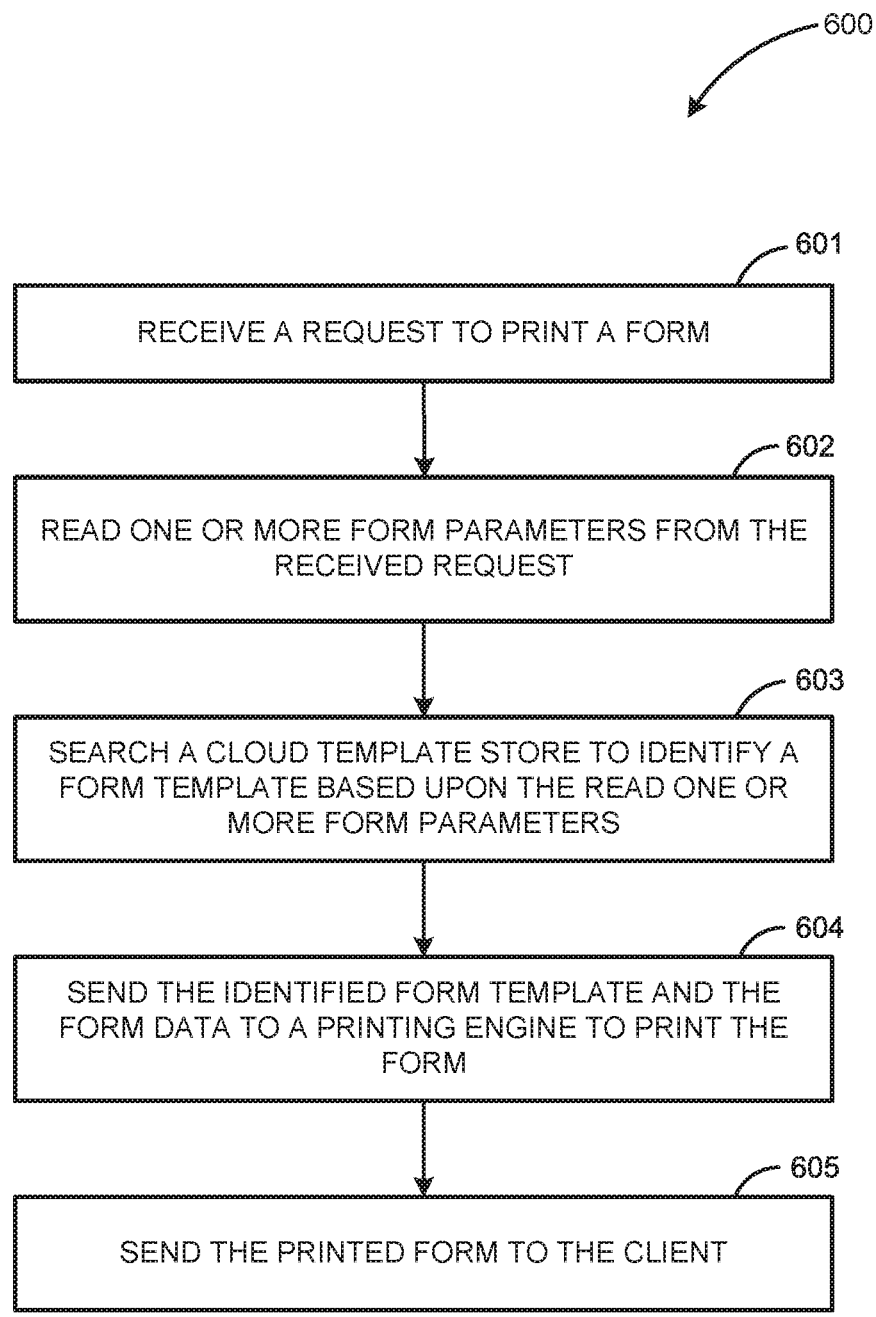
FIG. 6 is a flowchart illustrating a process of generating printed form on cloud based upon client's request, according to an embodiment.

FIG. 6 is a flowchart illustrating a process 600 to generate printed form on cloud based upon client's request, according to an embodiment. At 601, a request to print a form is received. In an embodiment, the request includes at least one of one or more form parameters for identifying a form template for which the print service is requested and one or more form data indicating values of one or more blank fields or placeholders within the form template for which service is requested. In an embodiment, a form parameter comprises one of the form ID, form locale, form version, and form status. At 602, the one or more form parameters are read from the received request. At 603, the cloud template store is searched, based upon the one or more form parameters, to identify a form template for generating the requested form. In an embodiment, the form template may be in an extensible markup language (XML) data package (XDP) format including XML schema of the form and optionally including scripts which control interactive feature of the form. At 604, the identified form template with/or without form data is sent to a printing engine (e.g., the printing engine 310 of FIG. 3) to print the form. In an embodiment, when the form data is not provided, an empty form (i.e., one or more blank fields or placeholders within the form template being empty or blank as form data is not provided) is printed. At 605, the printed form is sent to the client.

Embodiments provide integrated and centralized form services hosted on cloud (e.g., HANA® cloud platform or HCP). The integrated and centralized form services enable various registered clients (e.g., systems, users, modules, organization, etc.) to easily consume different form services from a centralized or single location. Various form templates corresponding to various countries and/or business requirements are pre-stored and may be used/reused easily. Different or all versions of a form may be tracked and retrieved easily, e.g., through a command. The form schema can be retrieved and/or edited and uploaded back onto the cloud. Forms may be automatically customized, localized, and generated based upon country's specific language, legal requirements, and business practices. The form templates may be updated easily at once based upon changes in legal requirements and/or business practices and there is no need to individually change or update forms in each product release or with each enhancement package. The forms may be translated in different language as per the requirements. The forms can be searched easily, e.g., based upon its tag(s) or metadata like author's name, data of creation, etc. Moreover, different registered clients may be assigned different access rights so that confidentiality of tenants or users may be maintained. For example, the form templates uploaded by one client may not be accessible to other clients. Further, the access rights (e.g., to edit, delete, read, update, etc.) may be restricted based upon designation of the user or client.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" includes a single medium or multiple media that stores one or more sets of instructions. The term "computer readable storage medium" includes physical article that is capable of undergoing a set of physical changes to physically store, encode, or otherwise carry a set of instructions for execution by a computer system which causes the computer system to perform the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs. DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 7:
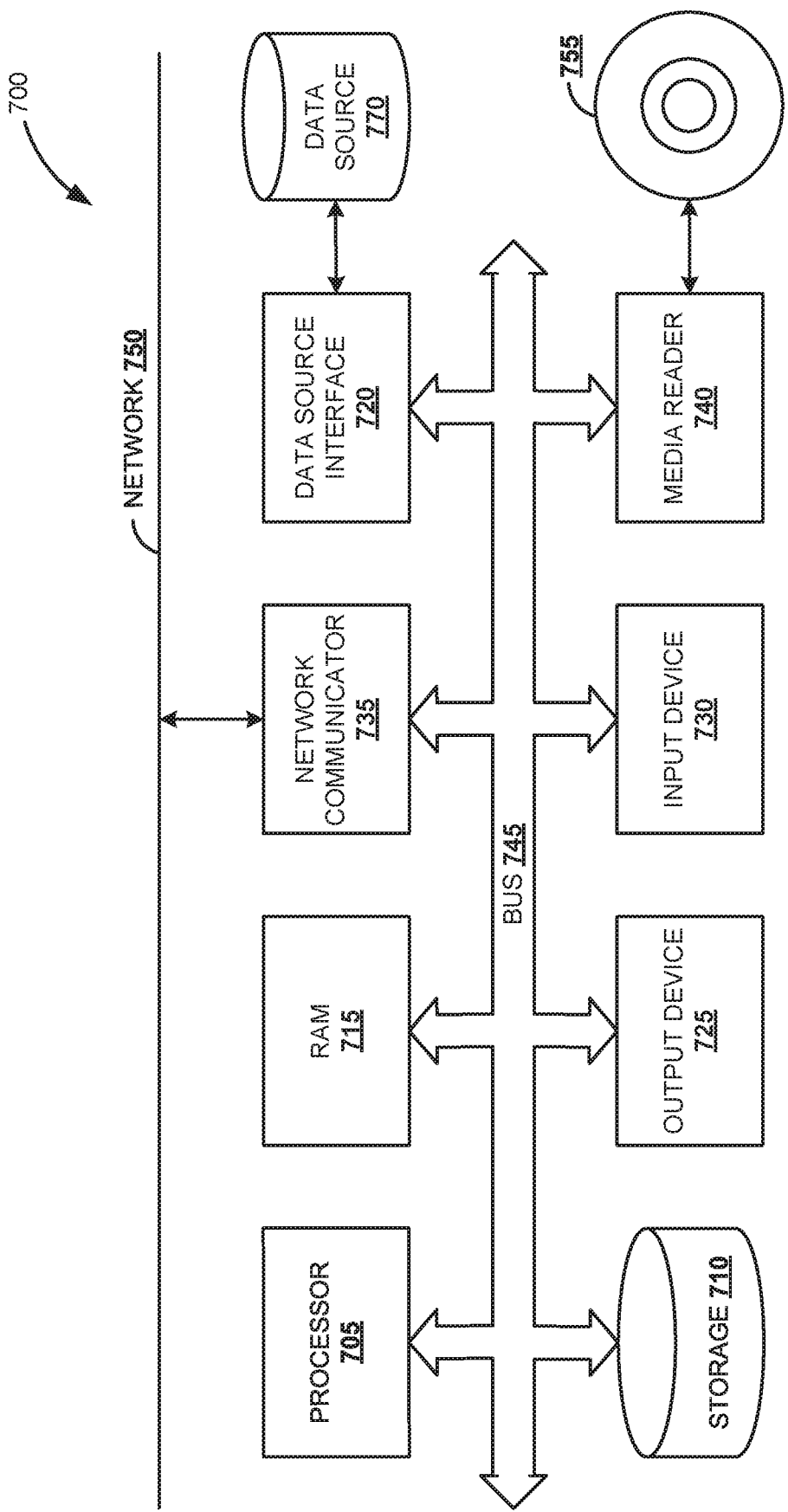
FIG. 7 is a block diagram illustrating an exemplary computer system, according to an embodiment.

FIG. 7 is a block diagram of an exemplary computer system 700. The computer system 700 includes a processor 705 that executes software instructions or code stored on a computer readable storage medium 755 to perform the above-illustrated methods. The processor 705 can include a plurality of cores. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. According to some embodiments, such as some in-memory computing system embodiments, the RAM 715 can have sufficient storage capacity to store much of the data required for processing in the RAM 715 instead of in the storage 710. In some embodiments, the data required for processing may be stored in the RAM 715. The stored instructions may be further compiled to generate other representations of the instructions and dynamically stored in the RAM 715. The processor 705 reads instructions from the RAM 715 and performs actions as instructed. According to one embodiment, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. The output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 770. The data source 770 can be accessed via one or more abstraction layers implemented in hardware or software. For example, the data source 770 may be accessed by network 750. In some embodiments the data source 770 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Database Connectivity (ODBC), produced by an underlying software system, e.g., an enterprise resource planning (ERP) system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments is to be determined by the following claims, which are to be interpreted in accordance with established doctrines of claim construction.

What is claimed is:

1. A non-transitory computer-readable medium coupled to one or more processors and having instructions stored thereon which, when executed by the one or more processors, cause the one or more processors to perform operations comprising:
receiving, from a registered tenant of a forms server, a first version of a form template and an indication that the first version of the form template is a private form template that is private to the registered tenant;
persisting the first version of the form template and the indication that the first version of the form template is a private form template to a template data store in an area of the template data store that is isolated to the registered tenant, wherein the area of the template data store that is isolated to the registered tenant includes other versions of the form template other than the first version of the form template;
receiving a request for all versions and locales of the first form template;
determining whether the request is from the registered tenant;
in response to determining that the request is not from the registered tenant, denying access to the area of the template data store that is isolated to the registered tenant; and
in response to determining that the request is from the registered tenant:
identifying, in the area of the template data store that is isolated to the registered tenant, all versions and locales of the form template, including the first version of the form template and the other versions of the form template;
and
providing, in response to the request, the first version of the form template and the other versions of the form template, to the registered tenant.

2. The non-transitory computer readable medium of claim 1, wherein the request is received through a tenant-specific uniform resource locator (URL) and the request includes a tenant account details including a tenant identifier (ID) and a password.

3. The non-transitory computer readable medium of claim 1, wherein the request is received through an open data protocol (OData) based application programming interface (API).

4. The non-transitory computer readable medium of claim 1, wherein the form parameters include a characteristic or metadata of the form template; and the form data includes values of one or more blank fields or placeholders within the form template.

5. The non-transitory computer readable medium of claim 4, wherein a form parameter of the form parameters comprises one of a form identifier (ID), form locale, form version, and form status, and wherein the form data is in Extensible markup language (XML) format.

6. The non-transitory computer readable medium of claim 4, wherein the request includes instructions to print the form, and wherein the operations comprise: providing the form template and the form data to a printing engine to print the form; and providing the printed form to a registered client.

7. The non-transitory computer readable medium of claim 6, wherein the form template is in an extensible markup language (XML) data package (XDP) format that includes an XML schema of the form and scripts control interactive feature of the form.

8. A computer-implemented method comprising:
receiving, from a registered tenant of a forms server, a first version of a form template and an indication that the first version of the form template is a private form template that is private to the registered tenant;
persisting the first version of the form template and the indication that the first version of the form template is a private form template to a template data store in an area of the template data store that is isolated to the registered tenant, wherein the area of the template data store that is isolated to the registered tenant includes other versions of the form template other than the first version of the form template;
receiving a request for all versions and locales of the first form template;
determining whether the request is from the registered tenant;
in response to determining that the request is not from the registered tenant, denying access to the area of the template data store that is isolated to the registered tenant; and
in response to determining that the request is from the registered tenant:
identifying, in the area of the template data store that is isolated to the registered tenant, all versions and locales of the form template, including the first version of the form template and the other versions of the form template;
and
providing, in response to the request, the first version of the form template and the other versions of the form template, to the registered tenant.

9. A computer system, comprising:
one or more processors; and
a computer-readable storage device coupled to the one or more processors and having instructions stored thereon which, when executed by the one or more processors, cause the one or more processors to perform operations comprising:
receiving, from a registered tenant of a forms server, a first version of a form template and an indication that the first version of the form template is a private form template that is private to the registered tenant;
persisting the first version of the form template and the indication that the first version of the form template is a private form template to a template data store in an area of the template data store that is isolated to the registered tenant, wherein the area of the template data store that is isolated to the registered tenant includes other versions of the form template other than the first version of the form template;

receiving a request for all versions and locales of the first form template;

determining whether the request is from the registered tenant;

in response to determining that the request is not from the registered tenant, denying access to the area of the template data store that is isolated to the registered tenant; and in response to determining that the request is from the registered tenant:

identifying, in the area of the template data store that is isolated to the registered tenant, all versions and locales of the form template, including the first version of the form template and the other versions of the form template;

and providing, in response to the request, the first version of the form template and the other versions of the form template, to the registered tenant.

\* \* \* \* \*